US008583128B2

(12) United States Patent
Choi et al.

(10) Patent No.: US 8,583,128 B2

(45) Date of Patent: Nov. 12, 2013

(54) APPARATUS AND METHOD FOR MAPPING PHYSICAL CONTROL CHANNELS

(75) Inventors: Hyung-Nam Choi, Hamburg (DE); Manfred Zimmermann, Sauerlach (DE); Maik Bienas, Braunschweig (DE)

(73) Assignee: Intel Mobile Communications GmbH, Neubiberg (DE)

(*) Notice: Subject to any disclaimer, the term of this patent is extended or adjusted under 35 U.S.C. 154(b) by 496 days.

(21) Appl. No.: 12/501,588

(22) Filed: Jul. 13, 2009

(65) Prior Publication Data

US 2011/0007695 A1 Jan. 13, 2011

(51) Int. Cl.
*H04W 40/00* (2009.01)

(52) U.S. Cl.
USPC ............ 455/448; 455/434; 455/450; 455/515

(58) Field of Classification Search
USPC ...................... 455/450, 446, 515, 455, 158.1; 370/328–338
See application file for complete search history.

(56) References Cited

U.S. PATENT DOCUMENTS

| | | | |
|---|---|---|---|
| 8,331,307 B2 | 12/2012 | Bui | |
| 2009/0097447 A1 | 4/2009 | Han et al. | |
| 2009/0116427 A1 | 5/2009 | Marks et al. | |
| 2010/0232373 A1* | 9/2010 | Nory et al. | 370/329 |
| 2011/0081856 A1* | 4/2011 | Johansson et al. | 455/7 |

FOREIGN PATENT DOCUMENTS

| | | | |
|---|---|---|---|
| CN | 101189816 | A | 5/2008 |
| CN | 101371477 | A | 2/2009 |
| CN | 101395831 | A | 3/2009 |
| EP | 1986364 | A1 | 10/2008 |
| WO | 2008084392 | A2 | 7/2008 |

OTHER PUBLICATIONS

3GPP TSG RAN #39, "Proposed SID on LTE-Advanced", NTT DoCoMo, Mar. 4-7, 2008, Puerto Vallarta, Mexico, pp. 1-5.
3GPP TS 36.211, V8.7.0, Technical Specification Group Radio Access Network, Evolved Universal Terrestrial Radio Access(E-UTRA), Physical Channels and Modulation, Release 8, May 2009, pp. 1-83.
3GPP TR 36.913, V0.0.7, Technical Specification Group Radio Acces Network, Requirements for Further Advancements for E-UTRA (LTE-Advanced), (Release X), May 2008, pp. 1-14.
Shkumbin Hamiti, IEEE 802.16m,"System Description Document", Nokia, http://ieee802.org/16, May 2009, pp. 1-185.
English abstract for CN 101151818 (A) dated Mar. 26, 2008.
English abstract for CN 101395831 (A) dated Mar. 25, 2009.

* cited by examiner

*Primary Examiner* — Kathy Wang-Hurst

(57) ABSTRACT

An apparatus and method that map physical control channels onto radio resource elements are described. The method may include mapping physical control channels of a first mobile radio technology onto a first set of radio resource element groups, mapping physical control channels of the second mobile radio technology onto a second set of radio resource element groups, generating mapping information specifying the mapping of physical control channels of the first mobile radio technology onto the first set of radio resource element groups, and generating mapping information specifying the mapping of physical control channels of the second mobile radio technology onto the second set of radio resource element groups.

23 Claims, 9 Drawing Sheets

700 Subframe Slot #i Slot #i+1 706 701 LTE-A LTE 702 704 703 f3 l=0 l=6 l=0 l=6 Frequency Time
1 PCFICH 708; 2 LTE PHICH 710; LTE-A PHICH 712; 4 LTE PDCCH 714; LTE-A PDCCH 716

APPARATUS AND METHOD FOR MAPPING PHYSICAL CONTROL CHANNELS

TECHNICAL FIELD

Various embodiments relate to an apparatus and a method for mapping physical control channels.

BACKGROUND

Implementing the next generation of mobile communication standards will require improving system capacity and spectral efficiency in order to increase data transmission rate beyond current levels. For example, Long Term Evolution-Advanced (LTE-A) is a current topic focused on technologies to further evolve the Long Term Evolution (LTE) air interface in terms of spectral efficiency, cell edge throughput, coverage, and latency. In addition to improving the LTE air interface, another important consideration is designing a communication system compatible with both LTE and LTE-A equipment.

For example, LTE networks employ packet-scheduling, which dynamically allocates resources to mobile communication device through time and frequency domain scheduling over a shared physical control channel. Current LTE networks, however, are unable to support mobile communication device having higher bandwidth capabilities than LTE mobile communication device. Thus, a network capable of supporting mobile communication devices with different bandwidth capabilities and/or mobile radio technologies is desired.

BRIEF DESCRIPTION OF THE DRAWINGS

The drawings are not necessarily to scale, emphasis instead generally being placed upon illustrating the principles of various embodiments. In the following description, various embodiments are described with reference to the following drawings, in which.

DESCRIPTION

The following detailed description refers to the accompanying drawings that show, by way of illustration, specific details and embodiments in which various embodiments may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

As detailed below, various embodiments provide methods and apparatuses for mapping physical control channels of two or more mobile radio technologies onto radio resource elements.

Example mobile radio technologies for use with embodiments of the invention, LTE and LTE-A, support multiple access methods for uplink transmissions (from mobile communication device to base station) and downlink transmissions (from base station to mobile communication device). For downlink transmission, Orthogonal Frequency Division Multiple Access (OFDMA) in combination with Time Division Multiple Access (TDMA) has been selected for Third Generation Partnership Project (3GPP) Long Term Evolution (LTE) air interface. OFDMA in combination with TDMA (OFDMA/TDMA) is a multicarrier, multiple access method in which a user equipment (UE), such as a mobile telephone, is provided with a defined number of subcarriers in the frequency spectrum for a defined transmission time for the purpose of data transmission. That is, a UE is assigned network resources in both the frequency and time domain. Uplink data transmission is based on Single Carrier Frequency Division Multiple Access (SC-FDMA) in combination with TDMA.

LTE and LTE-A also support the following duplexing methods: TDD, full-duplex FDD and half-duplex FDD. Full-duplex FDD uses two separate frequency bands for uplink and downlink transmissions such as media data or control information. Full-duplex FDD allows for uplink and downlink transmissions to occur simultaneously. Half-duplex FDD also uses two separate frequency bands for uplink and downlink transmissions, but transmissions do not overlap in time. TDD uses the same frequency band for both uplink and downlink transmissions. Although embodiments are described below in a full-duplex FDD environment, half-duplex FDD and TDD implementations are provided in alternative embodiments.

Figure 1:
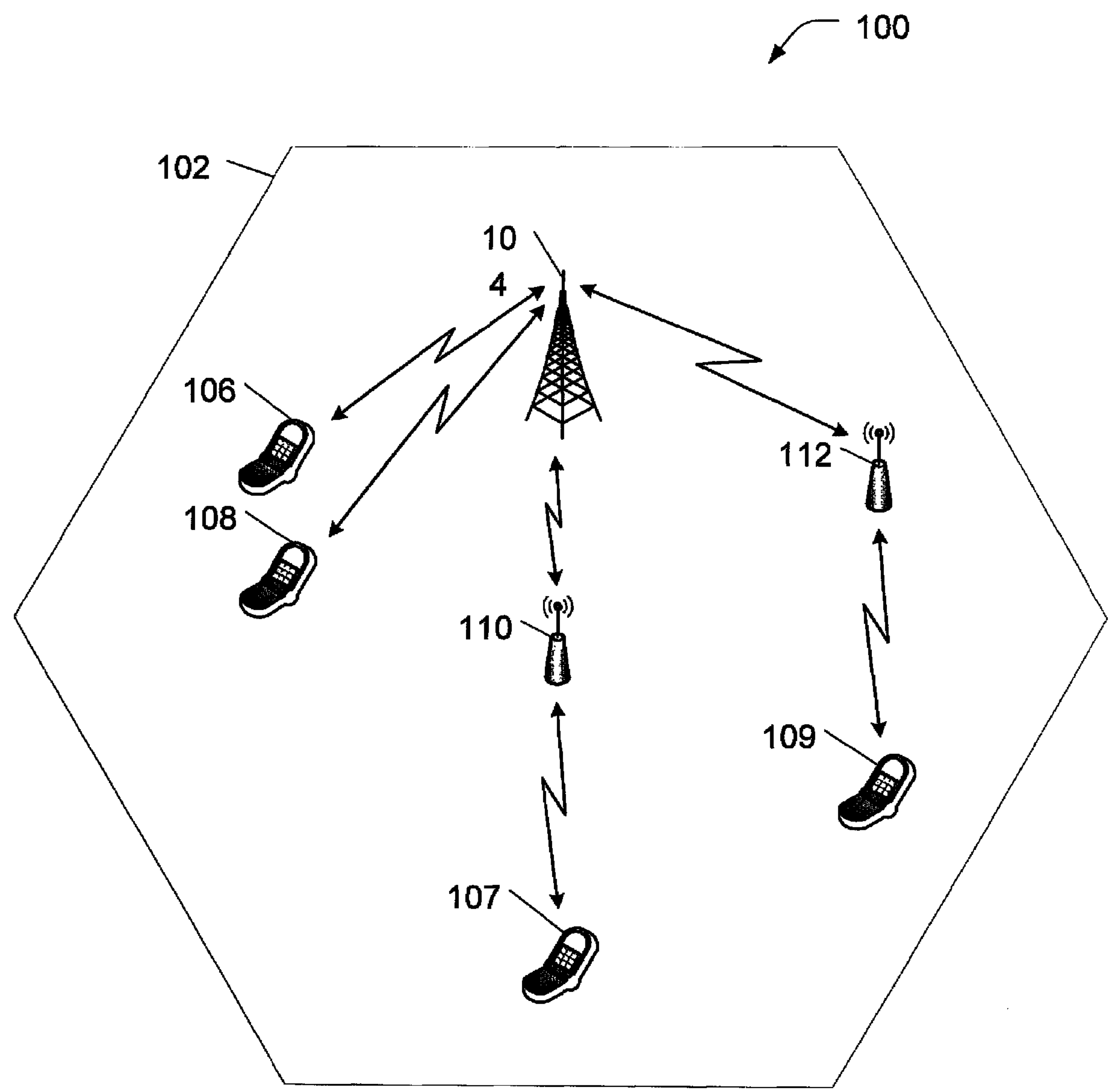
FIG. 1 shows an architectural overview of an example network architecture in accordance with an embodiment.

FIG. 1 shows an architectural overview of an example mobile radio network architecture in accordance with an embodiment. Mobile radio network 100 (e.g. a Cellular Wide Area radio communication network 100) may include base station 104, which provides coverage for mobile radio cell 102. In some embodiments, base station 104 is an LTE-eNodeB or an LTE-Advanced eNodeB. Base station 104 supports direct connections with LTE UE 106 and LTE-A UE 108. Relay nodes 110 and 112, sometimes referred to as NodeRs, may be deployed in the mobile radio cell for providing additional coverage at cell-edge or coverage holes. Relay nodes 110 and 112 may include a processer and a memory unit. LTE UE 107 and LTE-A UE 109 communicate with base station 104 via uplink and downlink transmissions through the intermediate relay nodes 110 and 112.

Mapping physical control channels onto radio resource elements for downlink transmissions to LTE UEs 106 and 107 may be performed by base station 104 applying a time and frequency-multiplexing scheme within the scope of the invention. Conventional LTE mapping techniques do not support bandwidths larger than 20 MHz, flexible spectrum usage, or spectrum sharing, all of which an LTE-A UE and mobile radio network may be capable of.

Mapping physical control channels onto radio resource elements for downlink transmissions to UEs 107 and 109 may be performed by relay nodes 110 and 112. For example, relaying or multi-hop communication is one way to improve the coverage, throughput, and capacity for existing and future cellular mobile radio communication systems at low deployment costs. In a multi-hop embodiment, relay nodes 110 and 112 may be deployed in the coverage area of the macro mobile radio cell 102 for providing additional coverage at mobile radio cell edge or coverage holes. In some embodiments, relay nodes 110 and 112 are adapted to function like a mobile radio base station for UEs 107 and 109 and/or adapted to function like a UE for mobile radio base station 104.

In one embodiment, mobile radio base station 104 is an LTE-A eNodeB, which supports direct connections with LTE UE 106 and LTE-A UE 108. Further, connections with LTE UE 107 and LTE-A UE 109 are supported through relay nodes 110 and 112, respectively.

In some embodiments, LTE UE 106 and LTE UE 107 may support a maximum RF transmission/reception bandwidth of 20 MHz and operate only in 20 MHz uplink and downlink bandwidths.

In some embodiments, LTE-A UE 108 and LTE-A UE 109 may support a maximum RF transmission/reception bandwidth of 60 MHz and operate in a combined 25 MHz uplink band. In some embodiments, LTE-A UE 108 and LTE-A UE 109 may operate in an overall 65 MHz downlink band. In some embodiments, the Physical Downlink Control Channels (PDCCHs) are transmitted in a frequency band shared by all UEs (LTE UE 106, LTE UE 107, LTE-A UE 108, and LTE-A UE 109).

Various embodiments encompass several types of relay nodes, which are categorized according to the functionality, mobility, and processing capabilities of the relay node.

A relay node may be categorized by the protocol layers the relay affects when relaying a signal. An L1 relay sends an amplified copy of its received signal and thus only affects the physical layer of an LTE or LTE-A network. An L2 relay receives and decodes signals up to an L2 protocol level and transmits a re-encoded signal. Thus, an L2 relay affects the physical layer and L2 protocol layers (e.g. MAC and RLC). An L3 relay affects the physical, L2, and L3 protocol layers and receives and forwards IP packets.

A relay node may be also categorized according to the mobility of the relay node. A Fixed Relay Node is permanently installed at a fixed location. A Nomadic Relay Node is intended to function from a location that is fixed for only periods of time. A Mobile Relay node is designed to function while in motion.

A relay node may also be classified as an Infrastructure Relay Node or a UE Relay Node.

As the above classifications illustrate, incorporating relaying functionality into the LTE-A system impacts both UE and base stations.

Figure 2A:
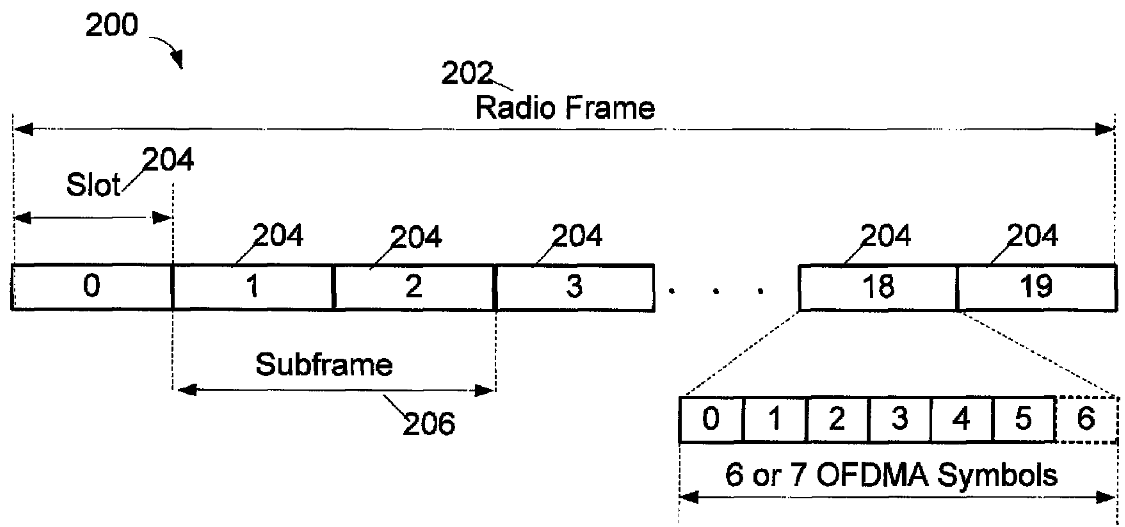
FIG. 2A shows an example frame structure for use with embodiments.

FIG. 2A shows an example frame structure for use with various embodiments. Frame structure 200 is applicable to full-duplex FDD, half-duplex FDD, OFDMA, and SC-FDMA. Each radio frame 202 is 10 ms long and may include or consist of 20 half-millisecond slots 204, numbered e.g. from 0 to 19. Subframe 206 may be defined as two consecutive slots. For FDD, 10 subframes may be available for downlink and uplink transmission in each 10 ms interval. Depending on the slot format, a slot 204 may include or consist of 6 or 7 OFDM symbols in downlink transmission and 6 or 7 SC-FDMA symbols in uplink transmissions. The OFDMA and SC-FDMA symbols may contain data as well as control information assigning network resources to a user.

Figure 2B:
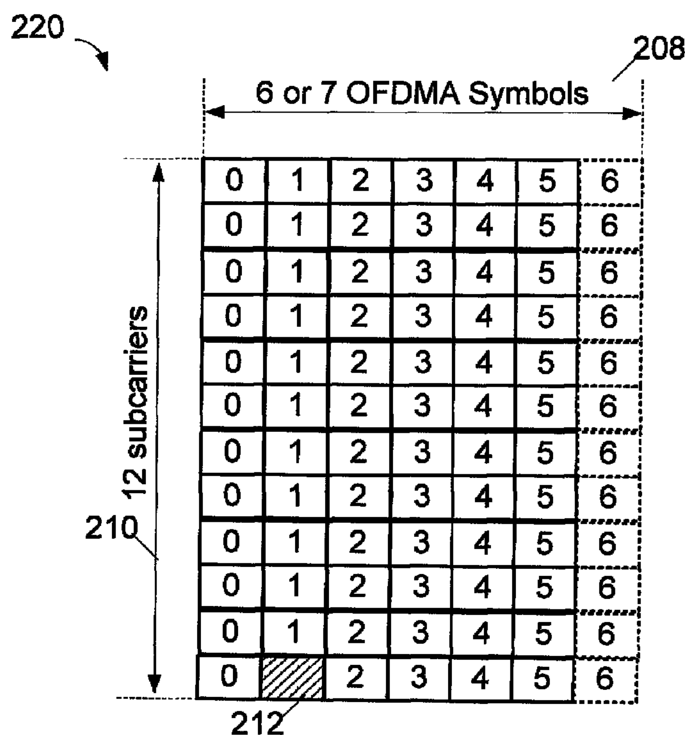
FIG. 2B shows an example resource block for use with embodiments.

FIG. 2B shows an example resource block for use with various embodiments. Physical resource block 220 is the baseline unit of allocation for the physical channels defined in LTE and LTE-A and is assigned by a conventional base station or relay node for transmitting uplink or downlink data. Downlink physical resource block 220 may include a matrix of 12 subcarriers 210 by 6 or 7 OFDMA symbols 208. A resource element 212 is the smallest unit of allocation for transmitting uplink or downlink data and comprises one OFDMA symbol and one subcarrier. In various embodiments, a transmission in an LTE network includes multiples of 12 subcarriers being simultaneously transmitted, and thus many resource blocks may also be transmitted simultaneously.

In some embodiments, an eNodeB signals the allocation of physical radio resources for data transmission on a Downlink Shared Channel (DL-SCH) and an Uplink Shared Channel (UL-SCH) through a control channel mapped on physical resource blocks. As used herein, a control channel may be a communication channel that carries at least control information. Examples of control information may include, but are not limited to, number of allocated resource blocks in the frequency domain, modulation and coding scheme, transmit power control commands, Hybrid Automatic Repeat ReQuest process number, and Positive Acknowledgements/Negative Acknowledgements (HARQ ACK/NAK). Scheduling and data transport between UE and a mobile radio base station or a relay node in an LTE or LTE-A network may occur over physical channels.

The Physical Uplink Shared Channel (PUSCH) may carry user data and control data on a UL-SCH transport channel. Resources for the PUSCH may be allocated on a sub-frame basis.

The Physical Uplink Control Channel (PUCCH) is a physical channel only. That is, no logical or transport channels are mapped to this channel. It carries the control information such as Hybrid Automatic Repeat ReQuest Positive Acknowledgements/Negative Acknowledgements (HARQ ACK/NAK) in response to downlink transmissions on PDSCH.

The Physical Downlink Shared Channel (PDSCH) is used mostly for data and multimedia transport by carrying user and control data on DL-SCH. It occupies the OFDPMA symbols in a subframe not occupied by Physical Downlink Control Channel.

The Physical Downlink Control Channel (PDCCH) carries the control information related to downlink transmissions such as resource allocation of DL-SCH. It also carries the control information related to uplink transmissions such as resource allocation of UL-SCH and Transmit Power Control commands for PUCCH and PUSCH.

Due to the different types of control information to be transmitted over the PDCCH, the control information may be grouped into so-called downlink control information (DCI) formats. For example, a PDCCH with DCI format 0 may be used for the scheduling resources for the PUSCH. The PDCCH occupies 1, 2, 3, or 4 OFDMA symbols in the first slot in a subframe. The number of symbols may be adjusted by a network and signaled on the Physical Control Format Indicator Channel (PCFICH).

The PCFICH may provide a UE the number of OFDMA symbols used for the PDCCHs. It may occupy the first OFDMA symbol in the first slot in a subframe and may be transmitted when the number of OFDMA symbols for PDCCH is greater than zero.

The Physical Hybrid Automatic Repeat Request Indicator Channel (PHICH) may carry Hybrid ARQ ACK/NAKs in response to uplink transmissions and may occupy 1, 2, or 3 OFDMA symbols in the first slot in a subframe. The number of symbols may be adjusted by a network and signaled on the Physical Broadcast Channel (P-BCH).

The P-BCH may carry system information to be broadcasted in the mobile radio cell such as downlink bandwidth information and number of OFDM symbols assigned to PHICH.

Physically, the downlink (DL) control channels PCFICH, PHICH, and PDCCH may be mapped to REGs (Resource Element Groups). An REG may include a definite number of resource elements (RE). The size of a REG may depend on the presence of the mobile radio cell-specific reference signals (RS). For example, in OFDMA symbols with RS, the REG size may be 6 REs (of which 2 REs may be used for RS), otherwise the REG size may be 4 REs. The number of available REGs may depend on the DL bandwidth size as listed in Table 1.

TABLE 1

Number of REGs depending on bandwidth size

| Bandwidth [MHz] | Number of REGs in OFDMA symbols with RS | Number of REGs in OFDMA symbols without RS |
|---|---|---|
| 1.4 | 12 | 18 |
| 3 | 30 | 45 |
| 5 | 50 | 75 |
| 10 | 100 | 150 |
| 15 | 150 | 225 |
| 20 | 200 | 300 |

Figure 3:
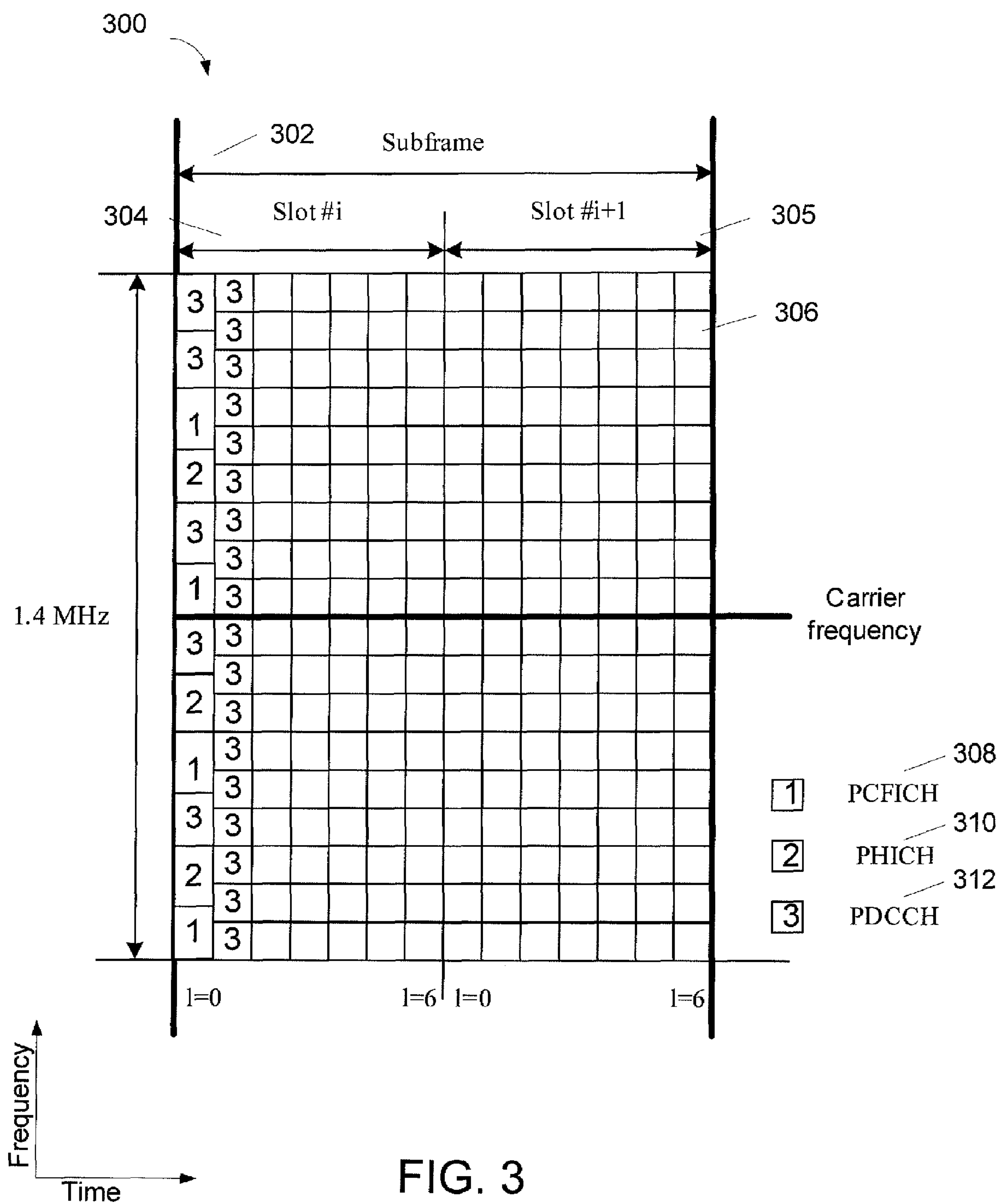
FIG. 3 shows a conventional resource mapping scheme.

In FIG. 3, a conventional resource mapping scheme is illustrated. In resource grid 300, the bandwidth of an LTE mobile radio cell is assumed to be 1.4 MHz. Subframe 302 is defined as two consecutive slots 304 and 305. A DL control channel region comprises 1 OFDMA symbol allocated for PHICH 310 and 2 OFDMA symbols allocated for PDCCH 312. Block 306 represents an REG size of 4 REs. The mapping of PCFICH 308, PHICH 310, and PDCCH 312 to REGs is conventionally performed in the following order: First, PCFICH 308 is mapped to 4 REGs equally spread over the bandwidth in the first OFDMA symbol (l=0). The 4 REGs are determined according to a pre-defined formula. Second, PHICH 310 is mapped in the first OFDMA symbol (l=0) to 3 REGs equally spread over the bandwidth and not occupied by PCFICH 308. Third, PDCCH 312 is mapped in the first two OFDMA symbols (l=0,1) to the remaining REGs not occupied by PCFICH 308 and PHICH 310.

The resource mapping scheme illustrated in FIG. 3, however, is compatible with only one type of mobile radio technology. In future mobile radio communication networks, accommodation of mobile radio technologies, with different bandwidths and capabilities, will need to be supported. Consequently, a more flexible resource allocation may be desired.

Figure 4:
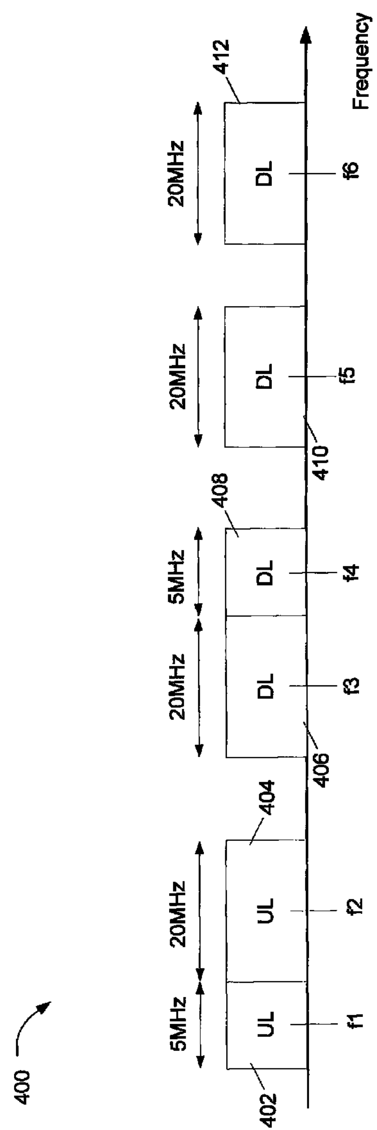
FIG. 4 shows an uplink and downlink frequency distribution for use with embodiments.

FIG. 4 shows an uplink and downlink frequency distribution for use with various embodiments. Uplink and downlink frequency distribution 400 may include two or more mobile radio technologies within a given bandwidth, for example, LTE and LTE-A. In some embodiments, an LTE-A mobile radio cell may operate in full-duplex FDD mode. For uplink transmission from an LTE-A UE, an overall 25 MHz may be allocated with two adjacent frequency bands 402 and 404 with respective carrier frequencies f1 and f2. For downlink transmission to an LTE-A UE, an overall 65 MHz may be allocated including or consisting of four frequency bands: two adjacent bands 406 and 408 with respective carrier frequencies f3 and f4, and two non-adjacent bands 410 and 412 with respective carrier frequencies f5 and f6. According to LTE-A terminology each frequency band 402, 404, 406, 408, 410, 412 is denoted as a component carrier.

For uplink transmission from an LTE UE, 20 MHz may be allocated via frequency band 404 with carrier frequency f2. For downlink transmission to an LTE UE, 20 MHz may be allocated via frequency band 406 with carrier frequency f3.

Although LTE UEs and LTE-A UEs may operate over different bandwidths, it is within the scope of various embodiments to transmit downlink control information, PDCCH for example, over the frequency band that both types of UEs use, frequency band 406. This enables an LTE-A network to be backwards compatible with LTE UEs.

It will be understood that although specific frequency bands, bandwidths, and number of frequency bands were recited in describing FIG. 4, FIG. 4 is one possible configuration within the scope of various embodiments and that there may be many variations or additions to this configuration. Variations within the scope of various embodiments include, but are not limited to, frequency bands larger or smaller than 5 MHz and 20 MHz, control channel information being transmitted over multiple carrier frequencies, and a total number of carrier frequencies being more or fewer than six.

In order to support mixed deployment scenarios in an LTE-A network, a Time Division Multiplexing/Frequency Division Multiplexing (TDM/FDM) scheme for mapping LTE and LTE-A compliant control channels onto radio resource elements is proposed.

Figure 5:
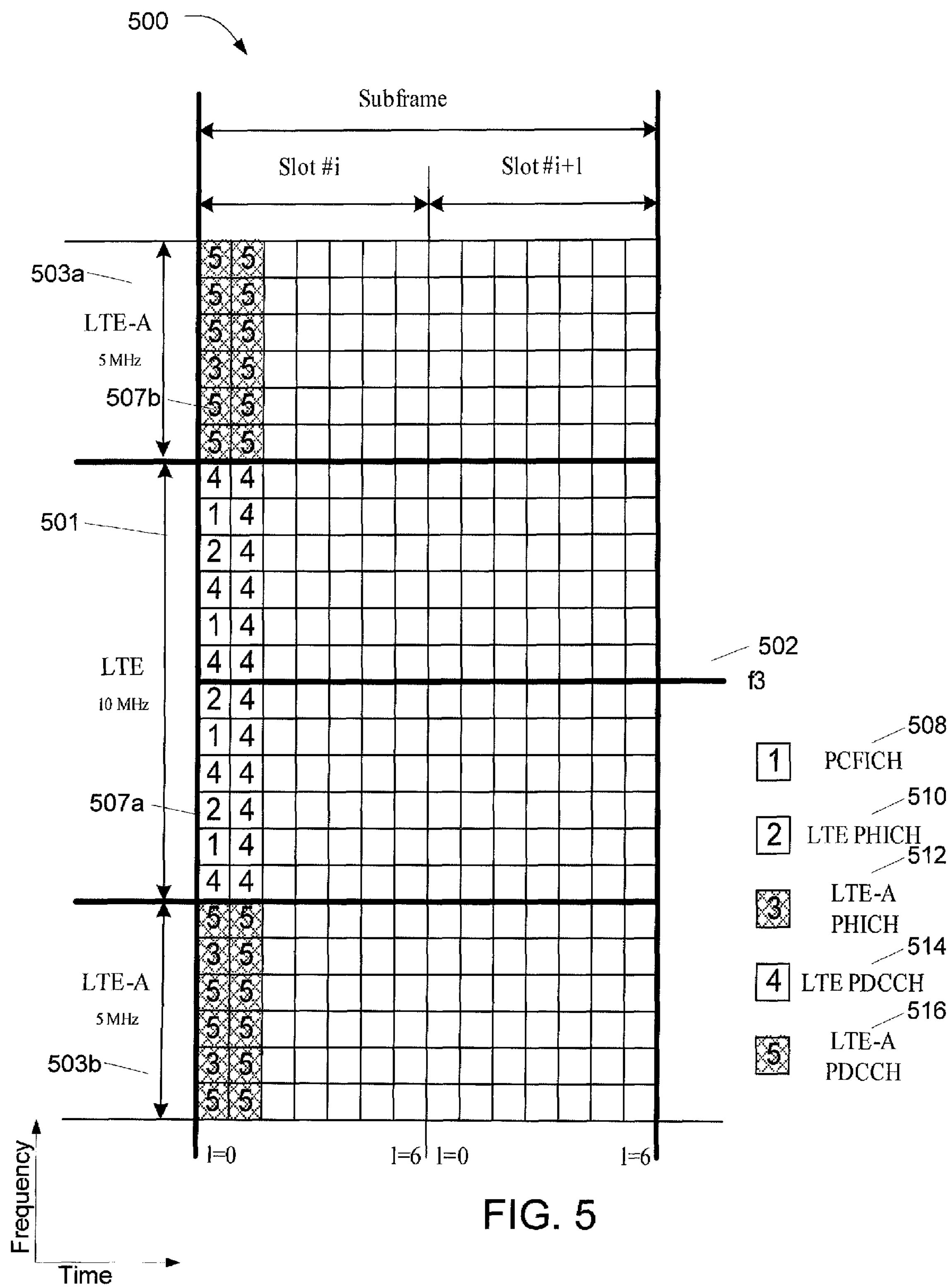
FIG. 5 shows a resource mapping scheme in accordance with an embodiment.

In FIG. 5, a resource mapping scheme in accordance with an embodiment is illustrated.

Resource grid 500 represents the time domain horizontally and the frequency domain vertically. For example, LTE-compliant bandwidth 501, is shown by a vertical arrow centered on carrier frequency f3 502. Similarly, LTE-A-compliant bandwidths 503*a* and 503*b* is shown by two vertical arrows, each outlining 5 MHz sidebands adjacent to the 10 MHz LTE-compliant bandwidth 501. Among the various DL component carriers, the component carrier characterized by carrier frequency f3 502 is configured to support mixed deployment scenario with LTE and LTE-A UEs. In some embodiments, all other DL component carriers may be configured to be non-LTE backwards compatible (e.g., component carriers characterized by other carrier frequencies).

Regarding the resource mapping scheme of the component carrier characterized by carrier frequency f3 502, the DL control channel region may include 1 OFDMA symbol allocated for PHICH 510 and 512 and 2 OFDMA symbols allocated for PDCCH 514 and 516.

In one embodiment, the 10 MHz frequency part centered on carrier frequency f3 502 is allocated for LTE operation. The 5 MHz frequency parts on each side of the 10 MHz frequency part are allocated for LTE-A operation. This may be signaled to a UE by a DL bandwidth parameter. The DL bandwidth information may be signaled on P-BCH (not shown). It will be understood that the number of REGs represented in FIG. 5 is less than the actual number corresponding to the 20 MHz bandwidth. The number of REGs are reduced for the sake of clarity in describing the various embodiments.

In some embodiments, the bandwidth size allocated for LTE and LTE-A operation is variable. A network may determine the bandwidth necessary to support LTE user operation and allocate the rest of the bandwidth to LTE-A operation. This determination may be based on, for example, LTE UE traffic, number of LTE UE users accessing a base station, or pre-determined. As more users obtain LTE-A UEs, the bandwidth needed for LTE operation may decrease. Thus, some embodiments may adapt bandwidth allocation on a cell-by-cell basis in response to the technology distribution of the users. In some embodiments, the bandwidth allocation may be determined uniformly for a whole network. In any case, variable LTE and LTE-A bandwidth allocation is within the scope of some embodiments. The determined LTE and LTE-A bandwidth allocation may be signaled explicitly on P-BCH. Determining a size for a bandwidth may include an active determination such as setting a bandwidth size or may include a passive determination such as making a check as to what the bandwidth size is currently set to by the network or some other entity.

The available REGs of the component carrier are separated into two sets. In some embodiments, all LTE-compliant control channels are mapped to REG set 1. That is, REG set 1 may include the LTE-compliant control channels mapped to the REGs within the 10 MHz around carrier frequency f3 502. REG set 1 is represented in FIG. 5 as the non-hatched REGs, for example REG 507*a*. Similarly, in some embodiments, all LTE-A compliant control channels may be mapped to the REGs within the 5 MHz frequency parts on each side of the 10 MHz frequency part centered on carrier frequency f3 502 to form REG set 2. REG set 2 is represented in FIG. 5 as the hatched REGs, for example REG 507*b*.

The scheme is applied to at least one of the component carriers available in the DL (e.g., component carriers with carrier frequencies f3-f6 of FIG. 4). It is within the scope of various embodiments that the complete or partial bandwidth of a component carrier is configured in compliance with LTE. This may be signaled to a UE by a DL bandwidth parameter. Further, the bandwidth of component carrier may be signaled on P-BCH (not shown).

In some embodiments, mapping information is generated specifying the radio technology of the physical control channels of REG set 1 and REG set 2. Mapping information may include, for example, a set's content, a set's compatible mobile radio technology (e.g., LTE, LTE-A), and/or other data which specifies a radio technology.

It will be understood that the mapping architecture shown in FIG. 5 is only one possible architecture for the base station 104, and that there may be many variations or additions to the architecture. For example, it is within the scope of various embodiments to form sets of individual radio resource elements as well as sets of REGs.

Figure 6A:
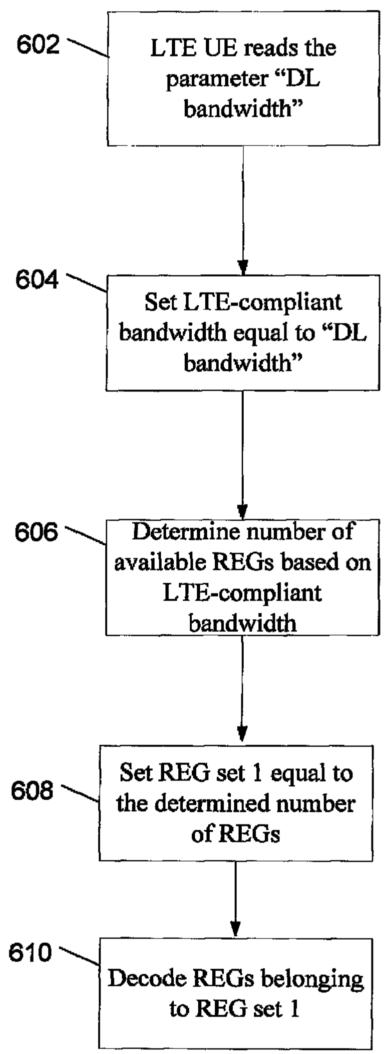
FIGS. 6A and 6B show a flow chart for determining a REG set in accordance with an embodiment.
Figure 6B:
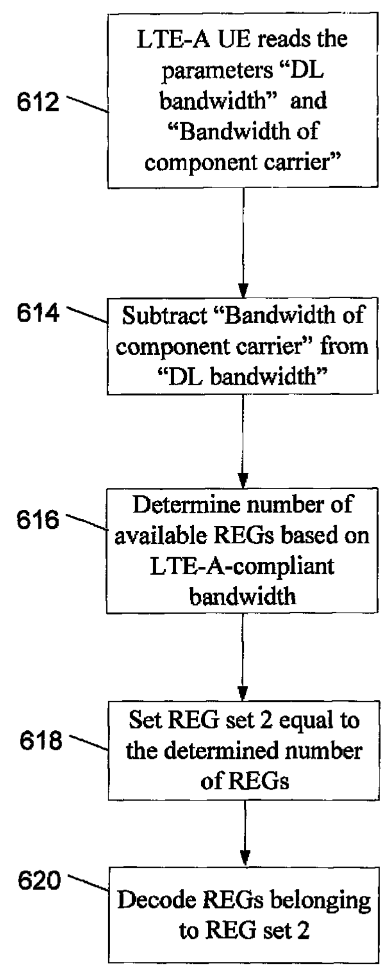

FIGS. 6A and 6B show a flow chart for determining a REG set in accordance with various embodiments. LTE and LTE-A UEs determine REG set 1 and set 2, and decode the LTE/LTE-A compliant control channels. At 602, an LTE UE reads from P-BCH the parameter "DL bandwidth" as 10 MHz. At 604, the size of LTE-compliant bandwidth is set to 10 MHz. At 606, based on the size of LTE-compliant bandwidth, the number of available REGs is determined. According to table 1, 100 REGs for OFDMA symbols with RS and 150 for the OFDMA symbols without RS may be determined. At 608, REG set 1 is set to the determined number of REGs. At 610, the LTE-compliant control channels are decoded on REGs belonging to REG set 1, e.g., PCFICH 508, LTE PHICH 510, and LTE PDCCH 514 mapped in the LTE-compliant 10 MHz frequency part as shown in FIG. 5. In some embodiments, the number of decoded REGs may be less than the determined number of available REGs.

At 612, an LTE-A UE reads the parameters "DL bandwidth" (10 MHz) and "Bandwidth of component carrier" (20 MHz) on P-BCH. At 614, the size of LTE-A compliant bandwidth is determined to be 10 MHz by subtracting "Bandwidth of component carrier" from "DL bandwidth". At 616, the number of available REGs is determined. According to table 1, 100 REGs for OFDMA symbols with RS and 150 for the OFDMA symbols without RS may be determined. At 618, REG set 2 is set to the determined number of REGs. At 620, the LTE-A compliant control channels are decoded on REGs belonging to REG set 2, e.g., LTE-A PHICH 512, and LTE-A PDCCH 516 mapped in the LTE-A-compliant frequency parts as shown in FIG. 5. In some embodiments, the number of decoded REGs may be less than the determined number of available REGs.

Figure 7:
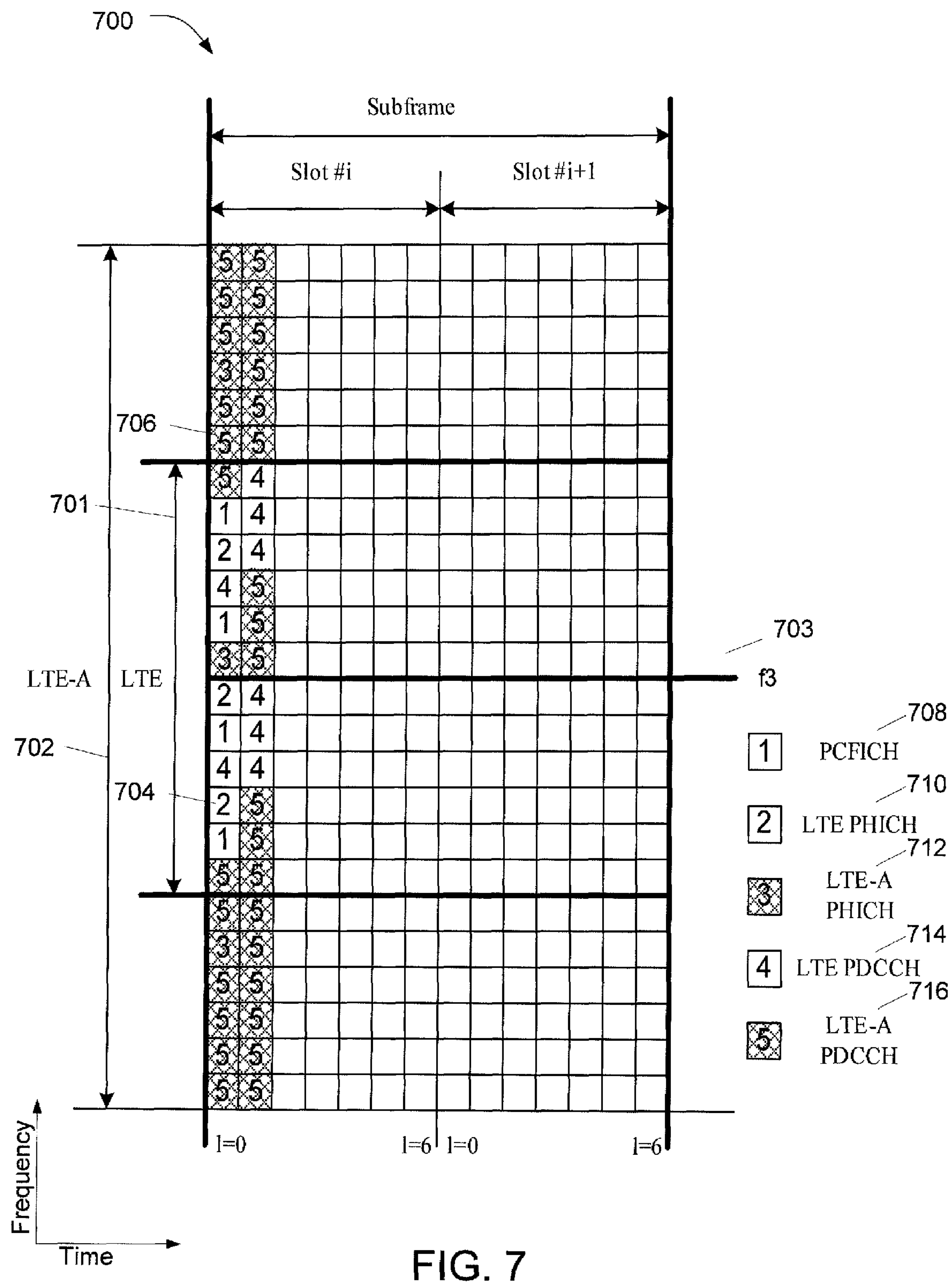
FIG. 7 shows a resource mapping scheme in accordance with an another embodiment.

FIG. 7 shows a resource mapping scheme in accordance with an another embodiment of the invention.

Resource grid 700 represents the time domain horizontally and the frequency domain vertically. For example, LTE-compliant bandwidth 701 is shown by a vertical arrow centered on carrier frequency f3 703. Similarly, LTE-A-compliant bandwidth 702 is shown by a vertical arrow centered on carrier frequency f3 703. Among the various DL component carriers, the component carrier characterized by carrier frequency f3 703 may be configured to support mixed deployment scenario with LTE and LTE-A UEs. In some embodiments, all other DL component carriers are configured to be non-LTE backwards compatible (e.g., component carriers characterized by other carrier frequencies).

In some embodiments, the bandwidth size allocated for LTE and LTE-A operation is variable. A network may determine the bandwidth necessary to support LTE user operation and allocate the rest of the bandwidth to LTE-A operation. This determination may be based on, for example, LTE UE traffic, number of LTE UE users accessing a base station, or pre-determined. As more users obtain LTE-A UEs, the bandwidth needed for LTE operation may decrease. Thus, some embodiments may adapt bandwidth allocation on a cell-by-cell basis in response to the technology distribution of the users. In some embodiments, the bandwidth allocation may be determined uniformly for a whole network. In any case, variable LTE and LTE-A bandwidth allocation is within the scope of some embodiments. The determined LTE and LTE-A bandwidth allocation may be signaled explicitly on P-BCH. Determining a size for a bandwidth may include an active determination such as setting a bandwidth size or may include a passive determination such as making a check as to what the bandwidth size is currently set to by the network or some other entity.

Regarding the resource mapping scheme of the component carrier characterized by carrier frequency f3 703, the DL control channel region may include 1 OFDMA symbol allocated for PHICH 710 and 712 and 2 OFDMA symbols allocated for PDCCH 714 and 716.

In one embodiment, the 10 MHz frequency part centered on carrier frequency f3 703 is allocated for LTE operation. This may be signaled to a UE by a DL bandwidth parameter. The DL bandwidth information may be signaled on P-BCH (not shown). The 20 MHz of the component carrier is allocated for LTE-A operation. It will be understood that the number of REGs represented in FIG. 7 is less than the actual number corresponding to the 20 MHz bandwidth. The number of REGs are reduced for the sake of clarity in describing the various embodiments.

The available REGs of the component carrier are separated into two sets. In one embodiment, the content of REG set 1 and set 2 is signaled to the UEs in the mobile radio cell, e.g. on P-BCH or on System Information Blocks (SIB) mapped on PDSCH. In some embodiments, all LTE-compliant control channels are mapped to REG set 1. That is, REG set 1 may include the LTE-compliant control channels mapped to the REGs within the 10 MHz around carrier frequency f3 703. REG set 1 is represented in FIG. 7 as the non-hatched REGs, for example REG 704. In some embodiments, LTE-A compliant control channels are mapped to the REGs within the 10 MHz around carrier frequency f3 703 and within the 5 MHz frequency parts on each side of the 10 MHz frequency part centered on carrier frequency f3 703 to form REG set 2. That is, REG set 2 comprises REGs in both the LTE and LTE-A compatible bandwidths. REG set 2 is represented in FIG. 7 as the hatched REGs, for example REG 706.

Because REG set 2 comprises REGs in both the LTE and LTE-A compatible bandwidths, an LTE-A UE is required to receive REGs from both the LTE and LTE-A compliant bandwidth to fully decode the LTE-A related control information.

The scheme is applied in at least one of the component carriers available in the DL (e.g., component carriers with carrier frequencies f3-f6 of FIG. 4). It is within the scope of various embodiments that the complete or partial bandwidth of a component carrier is configured in compliance with LTE. This may be signaled to a UE by a DL bandwidth parameter. Further, the bandwidth of component carrier may be signaled on P-BCE (not shown).

Figure 8A:
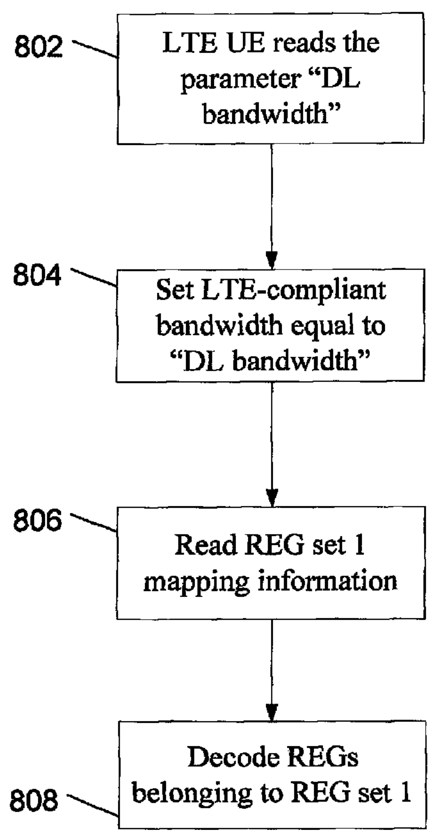
FIGS. 8A and 8B show a flow chart for determining a REG set in accordance with an embodiment.
Figure 8B:
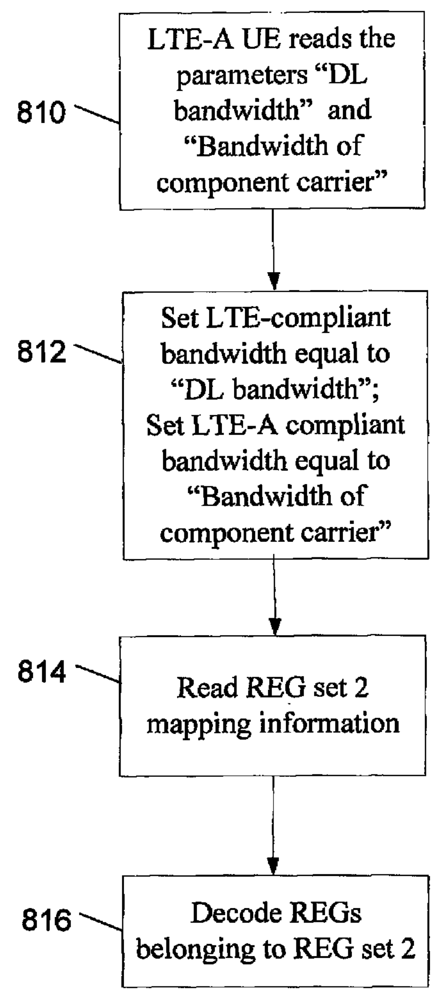

FIGS. 8A and 8B show a flow chart for determining a REG set within the scope of the invention. The LTE and LTE-A UEs determine REG set 1 and set 2, and decode the LTE/LTE-A compliant control channels. At 802, an LTE UE receives the parameter "DL bandwidth" as 10 MHz on P-BCH. At 804, the size of LTE-compliant bandwidth is set to 10 MHz. At 806, mapping information for REG set 1 is read. Mapping information may include which REGs assigned to the REG set 1 are within LTE-compliant bandwidth. In some embodiments, mapping information is generated specifying the radio technology of the physical control channels of REG set 1 and REG set 2. Mapping information may include, for example, a set's content, a set's compatible mobile radio technology (e.g., LTE, LTE-A), and/or other data which specify a radio technology.

Mapping information for REG set 1 may reside on the P-BCE or on SIBs mapped on PDSCH. At 808, the LTE-compliant control channels are decoded on REGs belonging to REG set 1, e.g., PCFICH 708, LTE PHICH 710, and LTE PDCCH 714 mapped in the LTE-compliant 10 MHz frequency part as shown in FIG. 7.

At 810, an LTE-A UE reads the parameters "DL bandwidth" (10 MHz) and "Bandwidth of component carrier" (20 MHz) on P-BCH. At 812, the size of LTE-compliant bandwidth is set to "DL bandwidth" (10 MHz) and the size of LTE-A compliant bandwidth is set to "Bandwidth of component carrier" (20 MHz). At 814, mapping information for REG set 2 is read. Mapping information may include which REGs assigned to the REG set 2 are within LTE or LTE-A compliant bandwidth.

Mapping information for REG set 2 may reside on the P-BCH or on SIBs mapped on PDSCH. At 816, the LTE-A-compliant control channels are decoded on REGs belonging to REG set 2, e.g., LTE-A PHICH 712, and LTE-A PDCCH 716 mapped in the LTE and LTE-A-compliant frequency parts as shown in FIG. 7.

Figure 9:
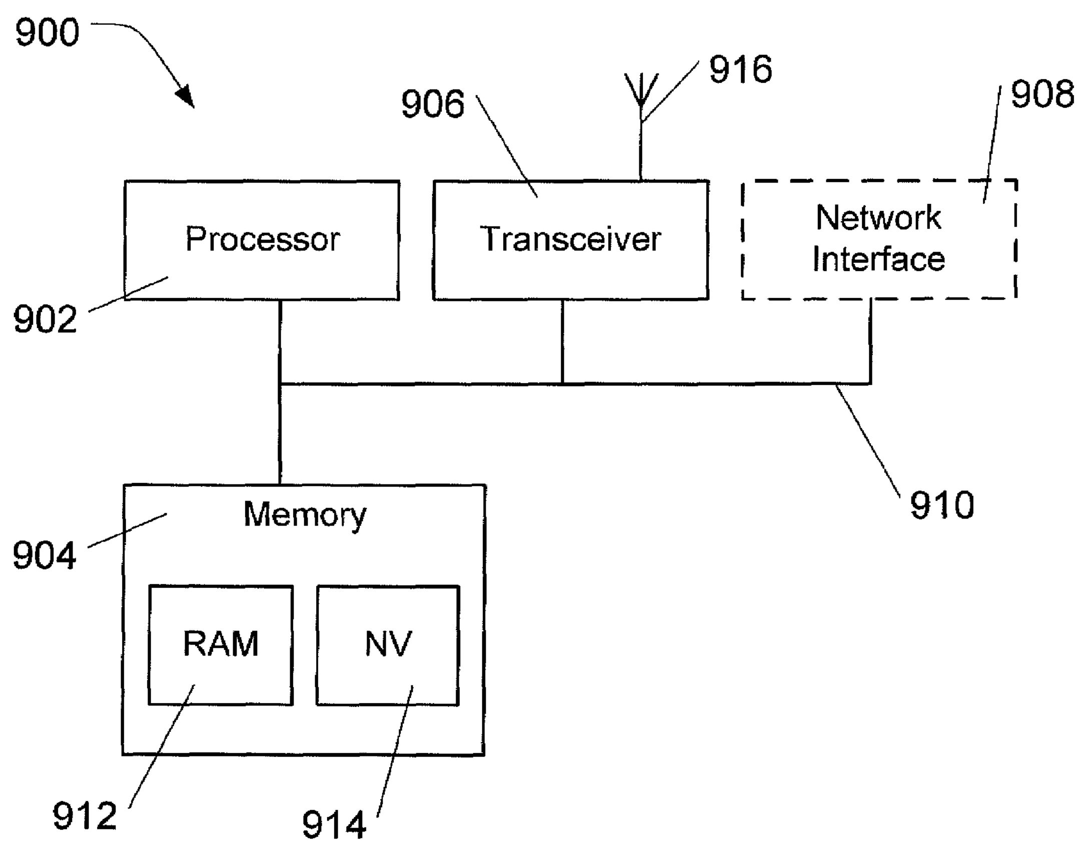
FIG. 9 is a block diagram illustrating an example architecture for a wireless communication device in accordance with an embodiment.

FIG. 9 shows a block diagram of an example architecture for wireless communication device 900 (WCD). As used herein, a wireless communication device is a device capable of receiving and/or transmitting signals over a wireless communication network. Examples include, but are not limited to, base stations, eNodeBs, relay stations, NodeRs, and UEs. WCD 900 includes processor 902, memory 904, transceiver 906, and network interface 908, connected by bus 910. In some embodiments, memory 904 may include random access memory 912, such as conventional DRAM, and non-volatile memory 914, such as conventional flash memory, for storing the firmware that operates WCD 900, as well as other parameters and settings that should be retained by WCD 900.

Transceiver 906 includes antenna 916, which is used for communication wirelessly with one or more UEs and/or WCDs. In some embodiments, for example eNodeBs and NodeRs, network interface 908 connects the WCD 900 to the core network, and may be a conventional wired network interface, such as a DSL interface, an Ethernet interface, or a USB interface that connects to an external computer or network interface device for connection to the core network. Alternatively, network interface 908 may be a wireless network interface that communicates with the core network via a wireless local-area network, a wireless metropolitan area network, or a wireless wide area network.

It will be understood that the architecture shown in FIG. 9 is only one possible architecture for WCD 900, and that there may be many variations or additions to the architecture. For example, WCD 900 may include I/O devices, such as a display (not shown), a smart card interface, and a smart card (not shown), to verify that WCD 900 is authorized for operation, or a variety of indicator lights or LEDs (not shown), to indicate the current status of WCD 900.

Some embodiments provide a method for mapping physical control channels onto radio resource element groups. The method includes mapping physical control channels of a first mobile radio technology onto a first set of radio resource element groups, wherein the first mobile radio technology operates within a first bandwidth. The method includes mapping physical control channels of the second mobile radio technology onto a second set of radio resource element groups, wherein at least one radio resource element group of the second set of radio resource element groups is within the first bandwidth and at least one radio resource element group of the second set of radio resource element groups is outside the first bandwidth.

The method includes generating mapping information specifying the mapping of physical control channels of the first mobile radio technology onto the first set of radio resource element groups and generating mapping information specifying the mapping of physical control channels of the second mobile radio technology onto the second set of radio resource element groups.

Some embodiments include determining a size for the first bandwidth and generating a first bandwidth parameter based on the determined first bandwidth size. Some embodiments include determining a size for a second bandwidth and generating a second bandwidth parameter based on the determined second bandwidth size, wherein a portion of the second set of radio resource element groups reside within the second bandwidth.

Some embodiments include transmitting the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

Some embodiments include receiving the first set of radio resource element groups, the mapping information of physical control channels of the first mobile radio technology, and the first bandwidth parameter, reading the mapping information of physical control channels of the first mobile radio technology, determining a number of expected resource element groups based on at least the first bandwidth parameter, and decoding a number of resource element groups equal or less to the number of expected resource element groups.

Some embodiments include receiving the second set of radio resource element groups, the mapping information of physical control channels of the second mobile radio technology, the first bandwidth parameter, and the second bandwidth parameter, reading the first bandwidth parameter, reading the second bandwidth parameter, determining a number of expected resource element groups based on at least the first bandwidth parameter and the second bandwidth parameter, and decoding a number of resource element groups equal or less to the number of expected resource element groups.

Some embodiments provide a method for mapping physical control channels onto radio resource element groups. The method includes mapping physical control channels of a first mobile radio technology onto a first set of radio resource element groups, wherein the first set of radio resource element groups is within a first bandwidth. The method includes mapping physical control channels of the second mobile radio technology onto a second set of radio resource element groups, wherein the second set of radio resource element groups is within a second bandwidth, and the second bandwidth does not overlap with the first bandwidth.

The method includes generating mapping information specifying the mapping of physical control channels of the first mobile radio technology onto the first set of radio resource element groups. The method includes generating mapping information specifying the mapping of physical control channels of the second mobile radio technology onto the second set of radio resource element groups.

Some embodiments include determining a size for the first bandwidth and generating a first bandwidth parameter based on the determined first bandwidth size. Some embodiments include determining a size for the second bandwidth and generating a second bandwidth parameter based on the determined second bandwidth size.

Some embodiments include transmitting the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

Some embodiments include receiving the first set of radio resource element groups, the mapping information of physical control channels of the first mobile radio technology, and the first bandwidth parameter, reading the first bandwidth parameter, determining a number of expected resource element groups based on at least the first bandwidth parameter, and decoding a number of resource element groups equal or less to the number of expected resource element groups.

Some embodiments include receiving the second set of radio resource element groups, the mapping information of physical control channels of the second mobile radio technology, the first bandwidth parameter, and the second bandwidth parameter, reading the first bandwidth parameter, reading the second bandwidth parameter, determining a number of expected resource element groups based on at least the first bandwidth parameter and the second bandwidth parameter, and decoding a number of resource element groups equal or less to the number of expected resource element groups.

Some embodiments provide a wireless communication device comprising a transceiver and a processor. The processor is configured to cause the wireless communication device to map physical control channels of a first mobile radio technology onto a first set of radio resource element groups, wherein the first mobile radio technology operates within a first bandwidth, map physical control channels of the second mobile radio technology onto a second set of radio resource element groups, wherein at least one radio resource element group of the second set of radio resource element groups is within the first bandwidth and at least one radio resource group element of the second set of radio resource element groups is outside the first bandwidth, generate mapping information specifying the mapping of physical control channels of the first mobile radio technology onto the first set of radio resource element groups, and generate mapping information specifying the mapping of physical control channels of the second mobile radio technology onto the second set of radio resource element groups.

Some embodiments include a processor further configured to cause the wireless communication device to determine a size for the first bandwidth and generate a first bandwidth parameter based on the determined first bandwidth size. Some embodiments include a processor further configured to cause the wireless communication device to determine a size for the second bandwidth and generate a second bandwidth parameter based on the determined second bandwidth size.

Some embodiments include a processor further configured to cause the wireless communication device to transmit the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

Some embodiments include the first mobile radio technology comprises long term evolution mobile radio technology and the second mobile radio technology comprises long term evolution-advanced mobile radio technology.

Some embodiments provide a wireless communication device comprising a transceiver and a processor. The processor is configured to cause the wireless communication device to map physical control channels of a first mobile radio technology onto a first set of radio resource element groups, wherein the first set of radio resource element groups is within a first bandwidth, and map physical control channels of the second mobile radio technology onto a second set of radio resource element groups, wherein the second set of radio resource element groups is within a second bandwidth and the second bandwidth does not overlap with the first bandwidth.

The processor is also configured to cause the wireless communication device to generate mapping information specifying the mapping of physical control channels of the first mobile radio technology onto the first set of radio resource element groups, and generate mapping information specifying the mapping of physical control channels of the second mobile radio technology onto the second set of radio resource element groups.

Some embodiments include a processor further configured to cause the wireless communication device to determine a size for the first bandwidth and generate a first bandwidth parameter based on the determined second bandwidth size.

Some embodiments include a processor further configured to cause the wireless communication device to determine a size for the second bandwidth and generate a second bandwidth parameter based on the determined second bandwidth size.

Some embodiments include a processor further configured to cause the wireless communication device to transmit the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

Some embodiments include the first mobile radio technology comprises long term evolution mobile radio technology and the second mobile radio technology comprises long term evolution-advanced mobile radio technology.

Some embodiments provide a user equipment comprising a transceiver and a processor. The processor is configured to cause the wireless communication device to read a first bandwidth parameter, determine a number of expected resource element groups based on at least the first bandwidth parameter, and decode a number of resource element groups equal or less to the number of expected resource element groups.

Some embodiments include a processor further configured to cause the user equipment to read mapping information specifying a mapping of physical control channels of a first mobile radio technology onto a first set of radio resource element groups.

Some embodiments include a processor further configured to cause the user equipment read mapping information specifying a mapping of physical control channels of a second mobile radio technology onto a second set of radio resource element groups, read a second bandwidth parameter, and determine the number of expected resource element groups based on at least the first bandwidth parameter and the second bandwidth parameter.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for mapping physical control channels onto radio resource element groups, the method comprising:

mapping physical control channels of a first mobile radio technology onto a first set of radio resource element groups, wherein the first mobile radio technology operates within a first bandwidth, the first bandwidth being within a frequency band of a component carrier;

mapping physical control channels of a second mobile radio technology onto a second set of radio resource element groups, wherein at least one radio resource element group of the second set of radio resource element groups is within the first bandwidth and at least one radio resource element group of the second set of radio resource element groups is outside the first bandwidth, and within the frequency band of the component carrier;

generating mapping information specifying the mapping of physical control channels of the first mobile radio technology onto the first set of radio resource element groups; and generating mapping information specifying the mapping of physical control channels of the second mobile radio technology onto the second set of radio resource element groups.

2. The method of claim 1, further comprising:

determining a size for the first bandwidth; and generating a first bandwidth parameter based on the determined first bandwidth size.

3. The method of claim 2, further comprising:

determining a size for a second bandwidth, wherein a portion of the second set of radio resource element groups is within the second bandwidth, the second bandwidth being at least within the frequency band of the component carrier; and generating a second bandwidth parameter based on the determined second bandwidth size.

4. The method of claim 3, further comprising transmitting the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

5. The method of claim 4, further comprising:

receiving the first set of radio resource element groups, the mapping information of physical control channels of the first mobile radio technology, and the first bandwidth parameter;

reading the mapping information of physical control channels of the first mobile radio technology;

determining a number of expected resource element groups based on at least the first bandwidth parameter; and decoding a number of resource element groups equal or less to the number of expected resource element groups.

6. The method of claim 4, further comprising:

receiving the second set of radio resource element groups, the mapping information of physical control channels of the second mobile radio technology, the first bandwidth parameter, and the second bandwidth parameter;

reading the first bandwidth parameter;

reading the second bandwidth parameter;

determining a number of expected resource element groups based on at least the first bandwidth parameter and the second bandwidth parameter; and decoding a number of resource element groups equal or less to the number of expected resource element groups.

7. A method for mapping physical control channels onto radio resource element groups, the method comprising:

mapping physical control channels of a first mobile radio technology onto a first set of radio resource element groups, wherein the first set of radio resource element groups is within a first bandwidth, the first bandwidth being within a frequency band of a component carrier;

mapping physical control channels of a second mobile radio technology onto a second set of radio resource element groups, wherein:

the second set of radio resource element groups is within a second bandwidth;

the second bandwidth is within the frequency band of the component carrier; and the second bandwidth does not overlap with the first bandwidth;

generating mapping information specifying the mapping of physical control channels of the first mobile radio technology onto the first set of radio resource element groups; and generating mapping information specifying the mapping of physical control channels of the second mobile radio technology onto the second set of radio resource element groups.

8. The method of claim 7, further comprising:

determining a size for the first bandwidth; and generating a first bandwidth parameter based on the determined first bandwidth size.

9. The method of claim 8, further comprising:

determining a size for the second bandwidth; and generating a second bandwidth parameter based on the determined second bandwidth size.

10. The method of claim 9, further comprising transmitting the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

11. The method of claim 10, further comprising:

receiving the first set of radio resource element groups, the mapping information of physical control channels of the first mobile radio technology, and the first bandwidth parameter;

reading the first bandwidth parameter;

determining a number of expected resource element groups based on at least the first bandwidth parameter; and decoding a number of resource element groups equal or less to the number of expected resource element groups.

12. The method of claim 10, further comprising:

receiving the second set of radio resource element groups, the mapping information of physical control channels of the second mobile radio technology, the first bandwidth parameter, and the second bandwidth parameter;

reading the first bandwidth parameter;

reading the second bandwidth parameter;

determining a number of expected resource element groups based on at least the first bandwidth parameter and the second bandwidth parameter; and decoding a number of resource element groups equal or less to the number of expected resource element groups.

13. A wireless communication device, comprising:

a transceiver; and a processor configured to cause the wireless communication device to:

map physical control channels of a first mobile radio technology onto a first set of radio resource element groups, wherein the first mobile radio technology operates within a first bandwidth, the first bandwidth being within a frequency band of a component carrier;

map physical control channels of a second mobile radio technology onto a second set of radio resource element groups, wherein at least one radio resource element group of the second set of radio resource element groups is within the first bandwidth and at least one radio resource group element of the second set of radio resource element groups is outside the first bandwidth, and within the frequency band of the component carrier;

generate mapping information specifying the mapping of physical control channels of the first mobile radio technology onto the first set of radio resource element groups; and generate mapping information specifying the mapping of physical control channels of the second mobile radio technology onto the second set of radio resource element groups.

14. The wireless communication device of claim 13, wherein the processor is further configured to cause the wireless communication device to:

determine a size for the first bandwidth; and generate a first bandwidth parameter based on the determined first bandwidth size.

15. The wireless communication device of claim 14, wherein the processor is further configured to cause the wireless communication device to:

determine a size for a second bandwidth, the second bandwidth being at least within the frequency band of the component carriers; and generate a second bandwidth parameter based on the determined second bandwidth size.

16. The wireless communication device of claim 15, wherein the processor is further configured to cause the wireless communication device to transmit the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

17. The wireless communication device of claim 13, wherein the first mobile radio technology comprises long term evolution mobile radio technology and the second mobile radio technology comprises long term evolution-advanced mobile radio technology.

18. A wireless communication device, comprising:

a transceiver; and a processor configured to cause the wireless communication device to:

map physical control channels of a first mobile radio technology onto a first set of radio resource element groups, wherein the first set of radio resource element groups is within a first bandwidth, the first bandwidth being within a frequency band of a component carrier;

map physical control channels of a second mobile radio technology onto a second set of radio resource element groups, wherein:

the second set of radio resource element groups is within a second bandwidth;

the second bandwidth is within the frequency band of the component carrier; and the second bandwidth does not overlap with the first bandwidth;

generate mapping information specifying the mapping of physical control channels of the first mobile radio technology onto the first set of radio resource element groups; and generate mapping information specifying the mapping of physical control channels of the second mobile radio technology onto the second set of radio resource element groups.

19. The wireless communication device of claim 18, wherein the processor is further configured to cause the wireless communication device to:

determine a size for the first bandwidth; and generate a first bandwidth parameter based on the determined second bandwidth size.

20. The wireless communication device of claim 19, wherein the processor is further configured to cause the wireless communication device to:

determine a size for the second bandwidth; and generate a second bandwidth parameter based on the determined second bandwidth size.

21. The wireless communication device of claim 20, wherein the processor is further configured to cause the wireless communication device to transmit the first set of radio resource element groups, the second set of radio resource element groups, the mapping information of physical control channels of the first mobile radio technology, the mapping information of physical control channels of the second mobile radio technology, the first bandwidth parameter, and the second bandwidth parameter.

22. The wireless communication device of claim 18, wherein the first mobile radio technology comprises long term evolution mobile radio technology and the second mobile radio technology comprises long term evolution-advanced mobile radio technology.

23. A user equipment, comprising:

a transceiver; and a processor configured to cause the wireless communication device to:

read mapping information specifying a mapping of physical control channels of a first mobile radio technology onto a first set of radio resource element groups, wherein the first mobile radio technology operates within a first bandwidth being within a frequency band of a component carrier;

read a first bandwidth parameter;

read mapping information specifying a mapping of physical control channels of a second mobile radio technology onto a second set of radio resource element groups, wherein at least one radio resource element group of the second set of radio resource element groups is within the first bandwidth and at least one radio resource element group of the second set of radio resource element groups is outside the first bandwidth and within the frequency band of the component carrier;

read a second bandwidth parameter;

determine the number of expected resource element groups based on at least the first bandwidth parameter and the second bandwidth parameter; and decode a number of resource element groups equal or less to the number of expected resource element groups.

* * * * *